United States Patent [19]

Klaue

[11] Patent Number: 5,148,778
[45] Date of Patent: Sep. 22, 1992

[54] COMBUSTION CHAMBER FOR A SELF-IGNITING OR SPARK-IGNITED VALVELESS TWO-STROKE INTERNAL COMBUSTION ENGINE

[75] Inventor: Hermann Klaue, Montreux, Switzerland

[73] Assignee: Datwyler AG, Altdorf, Fed. Rep. of Germany

[21] Appl. No.: 771,486

[22] Filed: Oct. 4, 1991

[51] Int. Cl.$^5$ .............................................. F02B 75/02
[52] U.S. Cl. ..................... 123/65 R; 123/657; 123/665
[58] Field of Search ............ 123/65 R, 657, 661, 123/664, 665

[56] References Cited

U.S. PATENT DOCUMENTS

| | | | |
|---|---|---|---|
| 4,300,499 | 11/1981 | Nakanishi et al. | 123/661 |
| 4,565,181 | 1/1986 | August | 123/661 |
| 4,864,986 | 9/1989 | Bethel et al. | 123/65 R |

Primary Examiner—David A. Okonsky
Attorney, Agent, or Firm—Herbert Dubno

[57] ABSTRACT

A combustion chamber assembly for a two-stroke internal combustion engine has, in the upper dead point position of the piston, a space defined between the piston bottom and the cylinder head which is of the shape of a frustum of a right-circular cone or the shape of a right-circular cylinder. Surfaces of the piston bottom and the cylinder head extend tangentially to the wall of the space at 180° offset from one another and are juxtaposed with surfaces of the cylinder head and piston bottom, respectively, defining narrow gaps squeezing fluid flow into this space tangentially form opposite directions to induce a vortex in the space in a single sense. The fuel injector opens axially into this space for autogenous ignition or self-firing or a spark plug extends axially into this space for external ignition.

7 Claims, 2 Drawing Sheets

COMBUSTION CHAMBER FOR A SELF-IGNITING OR SPARK-IGNITED VALVELESS TWO-STROKE INTERNAL COMBUSTION ENGINE

FIELD OF THE INVENTION

My present invention relates to a combustion chamber for spark-ignited or autogenous ignition (fuel-injection ignition) engines of the two-cycle or two-stroke type and, more particularly, to improvements in combustion chambers for such engines which avoid incomplete combustion, environmental pollution and soot formation.

BACKGROUND OF THE INVENTION

In a two-stroke or two-cycle internal combustion engine, a combustion chamber is defined between the head of the piston and the underside of a cylinder head in which a fuel/mixture is compressed and ignited by a spark from a spark plug triggered by an external triggering circuit or by an injection process or autogenously so that the compression heat effects the ignition. The combustion process within the combustion chamber drives the piston, in turn, and the process is repeated with discharge of the combustion products to an exhaust manifold in a well-known sequence of operations.

While a four-stroke or four-cycle engine operates with valves controlled by a timing chain or the like, the control of fluid flow, including the flow of the fuel/air mixture and exhaust gases or the air which is compressed within the combustion chamber is generally effected by the cooperation between the piston and slits forming the ports by means of which communication is effected between the intake manifold and the combustion chamber or between the exhaust manifold and the combustion chamber.

In prior art systems of this type, there is a tendency toward incomplete combustion so that, for example, in autogenous ignition engines, soot formation is observed. In this case and in the case of spark ignition engines, there may be incomplete combustion to the point that hydrocarbons can be released into the environment. By and large, therefore, two-stroke cycling engines require improvement with respect to the properties of the combustion. Printed German patent application D 14583 (published Dec. 20, 1956) discloses a piston-and-cylinder arrangement for a four-stroke engine using full injection and the principles of which, including its valving, are not directly applicable to a solution of the above-described problems of two-stroke engines.

OBJECTS OF THE INVENTION

It is, therefore, the principle object of the present invention to provide an improved combustion chamber for a spark-ignition or autogenous ignition two-stroke engine whereby drawbacks of earlier systems are avoided.

Another object of the invention is to provide a combustion chamber for an internal combustion engine operating in a two-stroke cycle, namely, a valveless engine, which provides a more efficient combustion, avoids incomplete sporadic or impulsive combustion and has a less detrimental effect upon the environment than earlier internal combustion engine systems operating in a two-stroke cycle.

Still another object of the invention is to provide a combustion chamber for a two-stroke valveless internal combustion engine in which the spark or ignition lag can be minimized.

SUMMARY OF THE INVENTION

These objects are attained, in accordance with the invention, in a combustion-chamber assembly for a two-stroke valveless internal combustion engine which comprises:

a preferably rectangular cross section cylinder having a cylinder head at an upper end of the cylinder, the head having an underside and the cylinder being provided with intake, exhaust and flushing air ports or slits in a wall of the cylinder spaced from this upper end;

a piston of corresponding cross section reciprocatable in the cylinder and having a piston bottom spacedly juxtaposed with the underside in an upper dead point position of the piston and delimiting between them a combustion chamber, the piston bottom and the underside defining in the position a combustion space forming part of the combustion chamber and having a configuration of a body of revolution of circular cross section centered on an axis of the space transverse to the common axis, the space being disposed along the common axis, the piston bottom and the underside being formed with respective first surfaces inclined to the common axis and tangentially extending in opposite directions from the space and offset by 180° from one another about the axis of the space, the underside and the piston bottom being each further formed with a respective second surface inclined to the common axis and juxtaposed with an opposite one of the first surfaces so as to define therewith a narrow gap squeezing respective flows in the combustion chamber into the space from opposite directions but inducing flow rotation in the space in the same sense; and means for initiating combustion of a fuel-air mixture along the axis of the space in the combustion chamber.

According to a feature of the invention, the internal combustion engine is a spark-fired engine and the means for initiating combustion includes a sparkplug oriented along an axis of this space, or is a fuel injector opening into this space along the axis of the space.

The body of revolution may be a right-circular cylinder or a frustum of a right-circular cone and the cylinder of the engine most preferably is of rectangular cross section.

BRIEF DESCRIPTION OF THE DRAWING

The above and other objects, features and advantages of the present invention will become more readily apparent from the following description, reference being made to the accompanying drawing in which.

FIG. is a perspective view of a working cylinder and piston of the invention in highly diagrammatic form.

SPECIFIC DESCRIPTION

Figure 1:
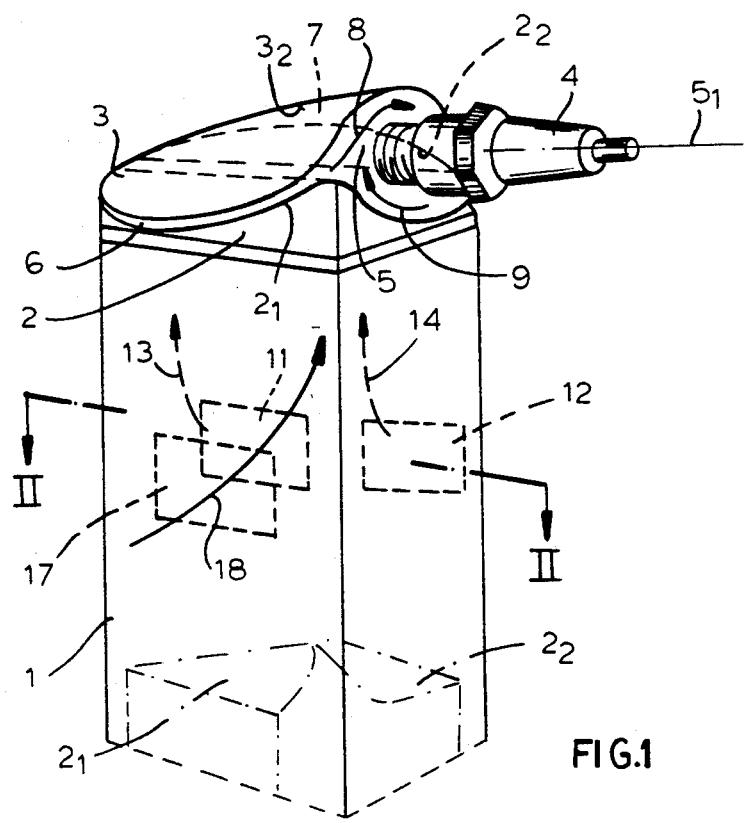
Figure 2:
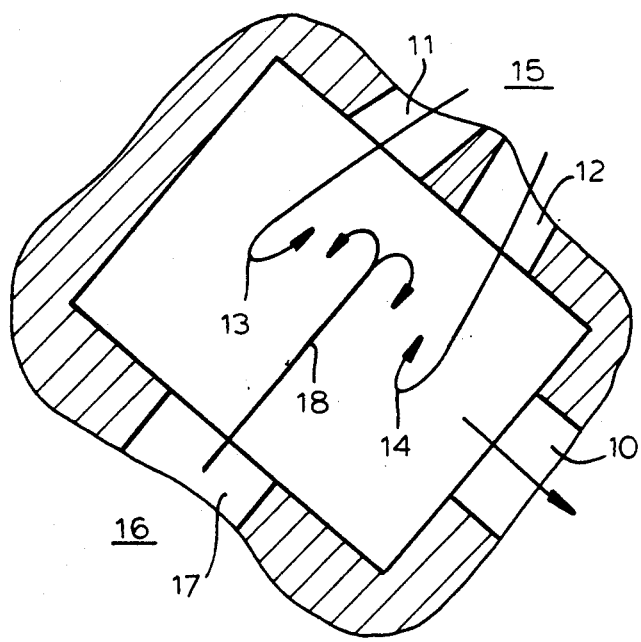
FIG. 2 is a section taken along the line II—II of FIG. 1.
Figure 3:
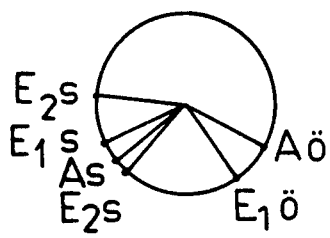
FIG. 3 is a material-exchange diagram for the embodiment of FIGS. 1 and 2 which represents a spark plug fired embodiment.

In the embodiment of FIGS. 1-3, the cylinder 1 is shown to be provided with a piston 2 whose head is juxtaposed with the underside 3 of the cylinder head and for which a spark plug 4 is provided to fire a fuel-air mixture in the combustion chamber.

The piston 2 is shown at its upper dead point in FIG. 1. At its upper dead point, the piston 2 has its upper surface of the piston defining with the cylinder head underside 3 a frustoconical space 5 along the center or axis of which extending perpendicular to the axis of the piston 2 and the cylinder 1, the spark plug 4 lies. The firing end of the spark plug is exposed to the fuel-air mixture in this space. The wall of the space 5 lies tangential to the inclined surface $3_1$ of the cylinder head and the inclined piston surface $2_2$ which are offset by 180° about the axis of the space 5, this axis coinciding with the axis of the spark plug and being represented by the dot-dash line $5_1$.

To the wall surface of the space 5, the inclined surfaces $3_1$ and $2_2$ extend tangentially and in the upper dead point position of the piston, the surface $3_1$ defines a gap 6 with the inclined piston surface $2_1$. Similarly, the cylinder head inclined surface $3_2$ defines the gap 7 with the aforementioned inclined surface $2_2$ of the piston. In the gaps 6 and 7 the compressive movement of the piston gives rise to a squeezing flow which, upon entering the space 5 in opposite directions, causes rotation of the gas in one direction (clockwise in FIG. 1).

The arrows 8 and 9 show this vortex movement of the flush gas. At the point of ignition, this gas is ignited at a comparatively high combustion speed. In the present embodiment, a layering of the fuel-air mixture entering the space from either side as well as a symmetrical inlet flow or control of the inlet flow is effected. While the outlet is effected through the slits 10 at the timing points represented at Aö and As as control points symmetrically via the piston upper edge, the beginning of the sweeping or flushing of the exhaust gas is effected with the aid of the flow-through slits 11 and 12 in the direction of the arrows, these slits being controlled by a rotating slider driven from the crank shaft and supplied with air by a compressor. The control can also be effected by a swingable cylinder angularly displaced about a pivot axis and driven by an auxiliary connecting rod from the crank shaft to form an oscillating piston compressor. Neither of these known expedients provided ahead of the slits 11 and 12 for supplying the flushing air has been shown in detail. They use known elements of which only the control slide segments 15 and 16 have been shown in FIG. 2 to represent them.

The control elements effect at control point $E_1$ö (FIG. 3) the influx of the flushing air while the inlet closure at $E_1$s is effected by the upper edge of the piston. An analogous control is provided shortly before or at the outlet closure control point As to feed the supersaturated fuel-air mixture into the combustion chamber at control point $E_2$ö through the slit 17 in the direction of arrow 18 (FIG. 2). Because of the short time during which mixing of the exhaust gas and fresh gas can occur during flushing, the conditions for a significant reduction of $NO_x$ generation during the combustion following flushing are met without fuel losses since charge layering between flushing air and fuel-air mixture occurs only after closure of the outlet.

The air and mixture feed slits are so arranged that, in preparation for the mixing process at which combustion occurs, the vortex of the flushing air surrounds the fuel-air mixture. This is symbolically represented by the arrows 13, 14 and 18 in FIG. 2, the arrows 13 and 14 representing the flushing air extending around the fuel-air mixture represented by the arrow 18.

As a result of the confinement of the fuel-air mixture within the vortex surrounded by the flushing air, the flushing process does not give rise to fuel losses which might otherwise result from an unsymmetrical flushing. Since the spark plug even during idling is always within an ignitable mixture, the misfiring common to two-stroke cycling engines is also excluded.

In FIGS. 4-7, the combustion chamber and piston-cylinder arrangement of a two-stroke internal combustion engine with autogenous ignition has been illustrated. This embodiment uses a combustion chamber piston which is of rectangular cross section (see especially FIG. 6) and is reciprocatable in a working cylinder which likewise is of rectangular cross section.

Figure 4:
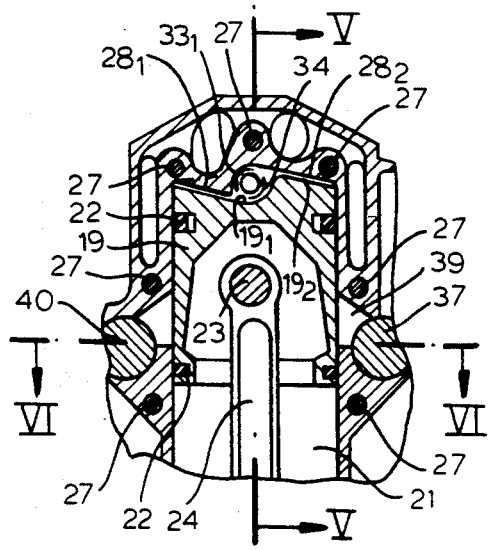
FIG. 4 is an axial cross sectional view taken along the line IV—IV of FIG. 5 and showing an autogenously-fired (fuel-injection) combustion chamber for a two-stroke valveless internal combustion engine.
Figure 5:
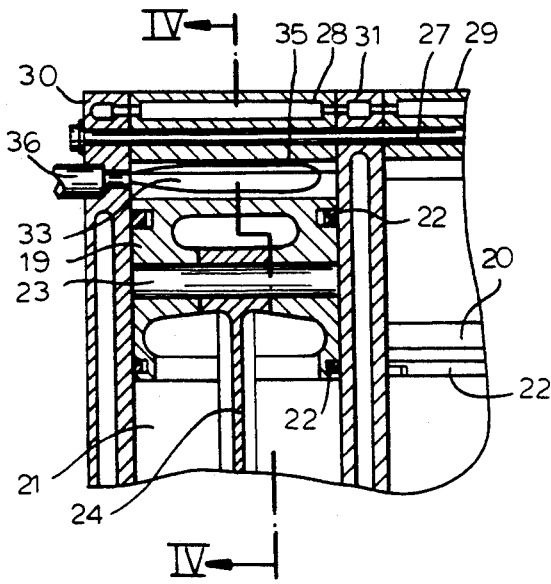
FIG. 5 is a section taken along the line V—V of FIG. IV.
Figure 6:
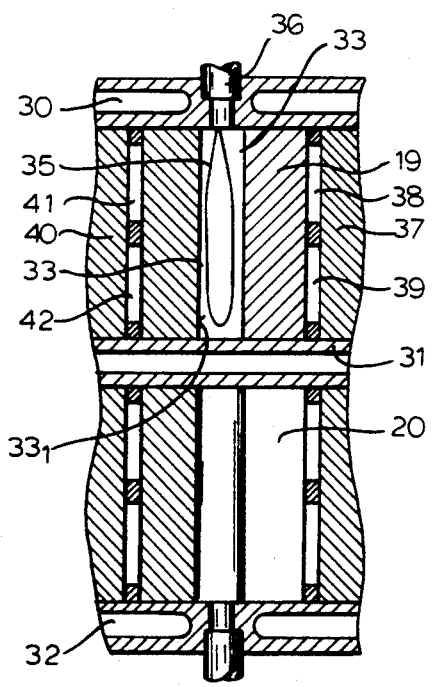
FIG. 6 is a section taken along the line VI—VI of FIG. 4.

FIGS. 4-6 show at 19 and 20 the two counteroperating pistons, one of which is shown at its upper dead point position while the other is at its lower dead point position and both of which have a common crankshaft in an engine having at least two cylinders. The cylinders or working chambers are represented at 21 and sealing is effected by flat sealing strips 22. The pistons are pivotally connected by the pins 23 to respective connecting rods 24 running to the crankshaft (not shown).

The rectangular cylinder chambers allow the engine housing to be formed from disk or plate-shaped housing parts 28 and 29 held together by bolts 27, and by cover members or cylinder head parts 30, 31 and 32. A relatively flat engine structure is thus formed.

The pistons and the cylinder heads form, in the upper dead point positions of the piston, combustion chambers 33 (FIGS. 4 and 5). The piston bottoms or crown ends defining the combustion chambers are so shaped that the surfaces $19_1$ and $19_2$ defining the lateral parts of the combustion chamber 33 and the corresponding surfaces $28_1$ and $28_2$ of the respective cylinder head are offset at 180° about the axis of the space $33_1$ which has the configuration of a right circular cylinder, which are tangential to the wall thereof and define narrow gaps with one another which open in opposite directions into this space so as to generate an intensive vortex 34 therein extending in the counterclockwise sense as shown in FIG. 4. Into the center of this vortex a fuel jet 35 is directed from the fuel injector nozzle 36 (FIGS. 5 and 6).

The fuel injection is effected at a sufficiently high pressure that a substantially coherent jet will extend with a minimum jet diameter over substantially the full length of the space $33_1$. A long fuel injection length and small jet diameter have been found to provide optimum fuel utilization. The condition should also be such that ignition can take place autogenously at the temperature generated by compression of the combustion air in the space 33 without an ignition lag upon injection of the fuel and so that fuel particles will not impinge upon the combustion chamber walls, thereby eliminating or limiting soot formation.

Figure 7:
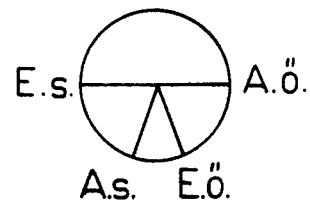
FIG. 7 is a material-exchange diagram for the embodiment of FIGS. 4-7 which represents an autogenously-fired valveless two-cylinder, two-stroke internal combustion engine with a working chamber which is of rectangular cross section.

FIG. 7 is a material exchange diagram similar to that of FIG. 3 showing the operating points in the cycle. This operating point diagram applies to an engine system having a secondary action an expansion or compression system about a pivot axis 37 laterally of the engine housing and parallel to the crankshaft axis. The oscillating piston of the secondary action device is fixed on the pivot axis. The pivot axis 37 is connected with the crankshaft by an auxiliary connecting rod and serves also as a control slider whose effect can be visualized with the operating point diagram of FIG. 7.

At the point Aö, connection is effected between the combustion chamber of piston 19 and the corresponding working chamber of piston 19 and the corresponding working chamber of the secondary device for compressing the air via the slits 38 and 39. From this point on, the piston is displaced together with the oscillating piston of the auxiliary unit until the oscillating piston opens the outlet of the secondary cylinder and atmospheric pressure prevails in both chambers. This system affords an improvement in efficiency. Furthermore, the noise generated by the engine is reduced and ignition lag is avoided together with the impulsive combustion which has hitherto resulted in both chemical and noise pollution of the environment.

The secondary expansion device of the invention essentially operates on the same principle with a precompression arrangement. The pivot axis 40 here controls the influx of precompressed air at the control point Eö of the control point diagram of FIG. 7 via the inlet slits 41 and 42 opposite the outlet slits. Until the control point As, the piston chamber of piston 19 is flushed and the combustion chamber is then supplied with precompressed air until the control point Es.

I claim:

1. A piston chamber assembly for a valveless two-stroke internal combustion engine comprising:
   a cylinder of rectangular transverse cross section having a cylinder head at an upper end of said cylinder, said head having an underside, said cylinder having intake, exhaust and flushing slits in a wall thereof spaced from said cylinder head;
   a piston of rectangular transverse cross section reciprocatable in said cylinder and having a piston crown spacedly juxtaposed with said underside in an upper dead point position of said piston and delimiting between them a combustion chamber, said piston and said cylinder having a common axis,
   said piston crown and said underside defining in said position a combustion space forming part of said combustion chamber and having a configuration of a body of revolution of circular cross section centered on an axis of said space transverse to said common axis, said space being disposed along said common axis,
   said piston crown and said underside being formed with respective first surfaces inclined to said common axis and tangentially extending in opposite directions from said space and offset by 180° from one another about said axis of said space,
   said underside and said piston crown being each further formed with a respective second surface inclined to said common axis and juxtaposed with an opposite one of said first surfaces so as to define therewith a narrow gap squeezing respective flows in said combustion chamber into said space from opposite directions but inducing flow rotation in said space in the same sense; and
   means for initiating combustion of a fuel-air mixture along said axis of said space in said combustion chamber.

2. The assembly defined in claim 1 wherein said internal combustion engine is a spark-fired engine and said means for initiating combustion is a spark plug oriented along said axis of said space.

3. The assembly defined in claim 1 wherein said internal combustion engine is a self-igniting engine and said means for initiating combustion is a fuel injector opening into said space along said axis of said space.

4. The assembly defined in claim 1 wherein said body of revolution is a right-circular cylinder.

5. The assembly defined in claim 1 wherein said body of revolution is a frustum of a right-circular cone.

6. The assembly defined in claim 1 wherein said cylinder is of rectangular cross section.

7. A piston chamber assembly for a two-stroke internal combustion engine comprising:
   a cylinder of rectangular transverse cross section having a cylinder head at an upper end of said cylinder, said head having an underside;
   a piston of rectangular transverse cross section reciprocatable in said cylinder and having a piston crown spacedly juxtaposed with said underside in an upper dead point position of said piston and delimiting between them a combustion chamber, said piston and said cylinder having a common axis,
   said piston crown and said underside defining in said position a combustion space forming part of said combustion chamber and having a configuration of a body of revolution of circular cross section centered on an axis of said space transverse to said common axis, said space being disposed along said common axis,
   said piston crown and said underside being formed with respective first surfaces inclined to said common axis and tangentially extending in opposite directions from said space and offset by 180° from one another about said axis of said space,
   said underside and said piston crown being each further formed with a respective second surface inclined to said common axis and juxtaposed with an opposite one of said first surfaces so as to define therewith a narrow gap squeezing respective flows in said combustion chamber into said space from opposite directions but inducing flow rotation in said space in the same sense; and
   means for initiating combustion of a fuel-air mixture along said axis of said space in said combustion chamber.

* * * * *